(12) United States Patent
Maruyama et al.

(10) Patent No.: US 11,353,063 B2
(45) Date of Patent: Jun. 7, 2022

(54) SINTERED BEARING

(71) Applicant: Diamet Corporation, Niigata (JP)

(72) Inventors: Tsuneo Maruyama, Niigata (JP); Yoshinari Ishii, Niigata (JP)

(73) Assignee: Diamet Corporation, Niigata (JP)

( * ) Notice: Subject to any disclaimer, the term of this patent is extended or adjusted under 35 U.S.C. 154(b) by 0 days.

(21) Appl. No.: 17/057,540

(22) PCT Filed: Apr. 15, 2019

(86) PCT No.: PCT/JP2019/016135
§ 371 (c)(1),
(2) Date: Nov. 20, 2020

(87) PCT Pub. No.: WO2019/225210
PCT Pub. Date: Nov. 28, 2019

(65) Prior Publication Data
US 2021/0190145 A1 Jun. 24, 2021

(30) Foreign Application Priority Data

May 23, 2018 (JP) .............................. JP2018-098896

(51) Int. Cl.
*F16C 33/10* (2006.01)
*F16C 33/74* (2006.01)

(52) U.S. Cl.
CPC ............ *F16C 33/74* (2013.01); *F16C 33/104* (2013.01); *F16C 2361/91* (2013.01)

(58) Field of Classification Search
CPC ...... F16C 33/74; F16C 33/104; F16C 33/128; F16C 33/145; F16C 2226/12; F16C 2220/20; F16C 2226/50; F16C 2226/74; F16C 2226/76; F16C 27/063; F16C 2361/91; F16J 15/3204; F16J 15/3268

USPC ......... 384/100, 107, 149, 279; 277/500, 549
See application file for complete search history.

(56) References Cited

U.S. PATENT DOCUMENTS 2,973,748 A * 3/1961 Leland .................... F15B 15/06
92/48
4,127,310 A * 11/1978 Werner .................. F16C 33/08
277/500
(Continued)

FOREIGN PATENT DOCUMENTS

CN 1327179 A * 12/2001 .............. F16C 33/74
CN 1439817 A 9/2003
(Continued)

OTHER PUBLICATIONS

International Search Report dated Jun. 11, 2019 for the corresponding PCT International Patent Application No. PCT/JP2019/016135.
(Continued)

*Primary Examiner* — Phillip A Johnson
(74) *Attorney, Agent, or Firm* — Leason Ellis LLP

(57) ABSTRACT

A sintered bearing includes a bearing main body which has a substantially cylindrical shape and is made of a sintered material, a through-hole being formed in a center of the bearing main body; a sealing member in a disk shape, the sealing member being configured to be disposed such that one surface side of the sealing member is in contact with the bearing main body, and an opening being formed in a center of the sealing member; and a locking member in a block shape, the locking member being configured to be in contact with at least another surface side of the sealing member and holding the sealing member between the locking member and the bearing main body.

3 Claims, 5 Drawing Sheets

(56) References Cited

U.S. PATENT DOCUMENTS

| | | | | |
|---|---|---|---|---|
| 6,008,557 | A | * | 12/1999 | Dornhoefer ............. F16C 23/04 310/90 |
| 8,322,497 | B2 | * | 12/2012 | Marjoram ............. F16F 13/002 188/267 |
| 2003/0102635 | A1 | * | 6/2003 | Akita .................... F16C 11/045 277/549 |
| 2007/0207706 | A1 | | 9/2007 | Takahashi |
| 2008/0301895 | A1 | * | 12/2008 | Bohn ..................... B60S 1/349 15/250.001 |
| 2011/0094481 | A1 | | 4/2011 | Zui et al. |
| 2012/0073139 | A1 | * | 3/2012 | Mizutani ............... F16C 33/107 29/898.02 |
| 2018/0058421 | A1 | * | 3/2018 | Bucher .................. F03C 1/061 |

FOREIGN PATENT DOCUMENTS

| | | | | |
|---|---|---|---|---|
| CN | 101082359 | A | | 12/2007 |
| CN | 205446408 | U | * | 8/2016 ........... F04D 29/057 |
| CN | 109983243 | A | | 7/2019 |
| EP | 2327909 | A1 | | 6/2011 |
| EP | 2462351 | B1 | * | 6/2017 ......... F04D 29/0462 |
| JP | 08-042365 | A | | 2/1996 |
| JP | 10-123840 | A | | 5/1998 |
| JP | 10-169472 | A | | 6/1998 |
| JP | 2001-349326 | A | | 12/2001 |
| JP | 2003120673 | A | * | 4/2003 ........... F16C 23/041 |
| JP | 2003-202022 | A | | 7/2003 |
| JP | 2004-068074 | A | | 3/2004 |
| JP | WO2002073053 | A1 | * | 7/2004 ............. F16C 33/74 |
| JP | 2005-130699 | A | | 5/2005 |
| JP | 2006-063398 | A | | 3/2006 |
| JP | 2007-234882 | A | | 9/2007 |
| JP | 2010-065729 | A | | 3/2010 |
| JP | 2013-007266 | A | | 1/2013 |
| KR | 20140023880 | A | * | 2/2014 ............. F16C 17/02 |
| WO | WO-2007080008 | A1 | * | 7/2007 ................ B60S 1/18 |
| WO | WO-2010/018650 | A1 | | 2/2010 |

OTHER PUBLICATIONS

Chinese Office Action dated Oct. 13, 2021 for the corresponding Chinese Patent Application No. 201980033339.2.

* cited by examiner

SINTERED BEARING

CROSS-REFERENCE TO RELATED PATENT APPLICATIONS

This application is a U.S. National Phase Application under 35 U.S.C. § 371 of International Patent Application No. PCT/JP2019/016135 filed Apr. 15, 2019 and claims the benefit of priority to Japanese Patent Application No. 2018-098896 filed May 23, 2018, both of which are incorporated herein by reference in their entirety. The International Application was published in Japanese on Nov. 28, 2019 as International Publication No. WO/2019/225210 under PCT Article 21(2).

FIELD OF THE INVENTION

The present invention relates to a sintered bearing that is formed of a sintered body to support a shaft member.

BACKGROUND OF THE INVENTION

A sintered product has many advantages such as not only being able to produce the sintered product in consistent quality and mass production but also being able to use a material that is difficult to compose in an ingot, and being able to produce a porous body. By utilizing the above-described characteristics, numbers of sintered products suitable for bearings, which are capable of being used in a position difficult to be lubricated due to its less labor for replenishing the lubricant, have been produced for practical use and used broadly as sintered bearings conventionally (for example, refer to Japanese Unexamined Patent Application, First Publication No. 2004-68074 and Japanese Unexamined Patent Application, First Publication No. 2006-63398). Such a bearing includes: oil-impregnated bearings capable of uniformly releasing a lubricant, which is absorbed in pores of the porous body, from the surface; dry bearings (dry friction bearing) that does not require the lubricant since material powder contains graphite with good lubricity; and the like.

Such a sintered bearing is used as a bearing supporting the valve shaft of the EGR apparatus (Exhaust Gas Recirculation apparatus), for example. Among the EGR valves, an EGR valve assembled as a set with a lip seal in order to prevent exhaust gas, liquid, or the like from flowing out along the thrust direction of the valve shaft is known (for example, refer to Japanese Unexamined Patent Application, First Publication No. 2013-7266). Furthermore, as the sintered bearing including the seal that prevents gas or liquid from flowing out along the thrust direction of the shaft, there is known, for example, one in which a sealing member is integrated with a bearing member (for example, refer to PCT International Publication No. WO 2010/018650). In addition, there is also known a valve including a valve body in which a sealing member is integrated with a bearing member (for example, refer to Japanese Unexamined Patent Application, First Publication No. 2003-202022).

Technical Problem

However, for example, in a configuration where a seal holding member that holds the sealing member is incorporated separately from the bearing member as in Japanese Unexamined Patent Application, First Publication No. 2013-7266, the seal holding member is required to be formed separately from the bearing member to hold the seal, and thus the structure becomes complicated and the production cost becomes high, which is a problem. In addition, in a configuration where the seal made of resin is insert-molded with an end portion of the bearing member, the sealing member is likely to peel off from the bearing member, and it is difficult to integrate the sealing member made of resin with the bearing member formed of a sintered body.

The invention has been made in light of the above-described circumstances, and an object of the invention provides a sintered bearing with a simple configuration at low cost, which is integrally provided with a sealing member that prevents a fluid from moving along a thrust direction of a shaft.

SUMMARY OF THE INVENTION

Solution to Problem

Namely, a sintered bearing of the invention has the following configuration.

The sintered bearing includes: a bearing main body which has a substantially cylindrical shape and is made of a sintered material, a through-hole being formed in a center of the bearing main body; a sealing member in a disk shape, the sealing member being configured to be disposed such that one surface side of the sealing member is in contact with the bearing main body, and an opening being formed in a center of the sealing member; and a locking member in a block shape, the locking member being configured to be in contact with at least other surface side of the sealing member and hold the sealing member between the locking member and the bearing main body.

According to the sintered bearing of the invention, the sealing member is interposed and fastened between the bearing main body and the locking member. In such a manner, the locking member and the sealing member can be easily integrated by merely fastening the bearing main body and the locking member.

Accordingly, as compared to a configuration where the sealing member is directly joined to the bearing main body as in the related art, in the invention, since the sealing member is firmly interposed between the bearing main body and the locking member, there is no risk of occurrence of a defect such as peeling off of the sealing member from the bearing main body, which may occur in direct joining such as bonding, and the sealing member function can be realized with higher reliability and a simpler configuration.

In addition, as compared to a case where the bearing which supports a valve shaft and the seal which prevents a fluid from moving along the valve shaft are incorporated as separate members, the functions of the bearing and the seal for the fluid can be realized at lower cost and with a simpler configuration.

In addition, in the invention, the locking member may be press-fitted into the bearing main body.

In addition, in the invention, the sintered bearing may further include a ring member that covers outer peripheral surface sides of the bearing main body and the locking member, wherein the bearing main body and the locking member are press-fitted into the ring member.

In addition, a sintered bearing of the invention has the following configuration.

The sintered bearing includes: a bearing main body which has a substantially cylindrical shape and is made of a sintered material, a through-hole being formed in a center of the bearing main body; a locking member configured to be fixed to the bearing main body; and a sealing member, an opening being formed in a center of the sealing member, and a peripheral edge of the sealing member being configured to be locked by the locking member.

In addition, in the invention, the locking member may be a caulking ring that is press-fitted into the bearing main body and is provided with a recessed portion into which the peripheral edge of the sealing member is fitted.

In addition, in the invention, the locking member may be configured to cover an outer peripheral surface side of the bearing main body and to lock the sealing member on one end side of the bearing main body by caulking.

In addition, in the invention, the sealing member may protrude further outward than an outer peripheral surface of the locking member.

DETAILED DESCRIPTION OF THE INVENTION

Figure 1:
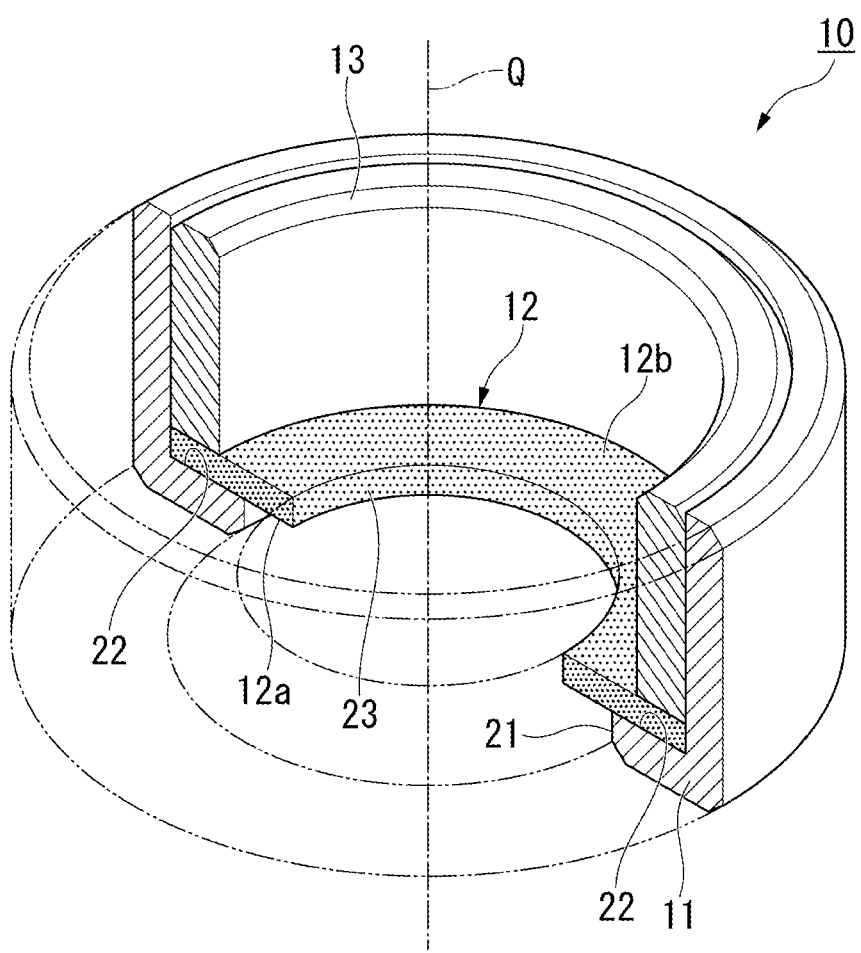
FIG. 1 is a partially cutaway perspective view illustrating a sintered bearing according to a first embodiment of the invention.

Hereinafter, sintered bearings according to embodiments of the invention will be described with reference to the drawings. Incidentally, each of the embodiments illustrated below will be specifically described to help better understanding the concept of the invention, and unless otherwise specified, does not limit the invention. In addition, in the drawings used in the following description, in order to facilitate understanding features of the invention, for convenience, portions that are main components may be illustrated in an enlarged manner, and the dimensional ratio or the like of each component may not be the same as the actual one.

First Embodiment

Figure 2:
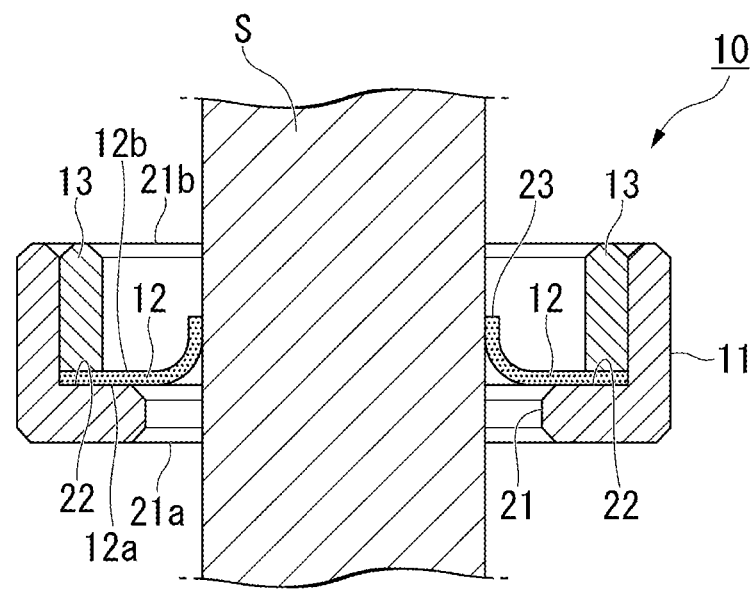
FIG. 2 is a cross-sectional view illustrating a state where a shaft is held by the sintered bearing illustrated in FIG. 1.

FIG. 1 is a partially cutaway perspective view illustrating a sintered bearing according to a first embodiment of the invention. In addition, FIG. 2 is a cross-sectional view illustrating a state where a shaft is held by the sintered bearing illustrated in FIG. 1.

A sintered bearing 10 is used, for example, as a component of an EGR valve provided in an EGR passage of an exhaust gas recirculation device (EGR device). A valve shaft S that is reciprocally moved (stroke motion) by an actuator to open and close a valve body with respect to a valve seat is provided via the sintered bearing 10 in a housing of the EGR valve. The sintered bearing 10 is a member in which the function of a seal that air-tightly seals a gap between the valve shaft S and the housing and the function of a bearing are integrated.

The sintered bearing 10 includes a bearing main body 11 having a substantially cylindrical shape, a sealing member 12 in a disk shape, and a locking member 13 in a block shape.

The bearing main body 11 is made of a sintered material such as a bronze material (Cu—Sn—C), a phosphor bronze material (Cu—Sn—P—C), a white copper material (Cu—Ni—Sn—C or Cu—Ni—Sn—P—C), a nickel copper material (Ni—Cu—Sn—P—C or Ni—Cu—Sn—P—BN) or the like.

The bearing main body 11 is an annular member having a substantially L-shaped cross-section, and for example, a through-hole 21 through which the valve shaft S of the EGR valve penetrates along a center axis Q is formed in the center of the bearing main body 11. A step portion 22 that is widened in a direction perpendicular to the center axis Q is provided between one opening end 21a and the other opening end 21b of the through-hole 21.

The sealing member 12 is made of, for example, polyurethane rubber, tetrafluoroethylene resin, or the like, and for example, an opening 23 through which the valve shaft S of the EGR valve penetrates is formed in a center of the sealing member 12. The sealing member 12 is disposed such that a one surface 12a side is in contact with the step portion 22 forming a flat surface of the bearing main body 11.

The inner diameter of the opening 23 of the sealing member 12 is smaller than the inner diameter of the through-hole 21 of the bearing main body 11, and is smaller than the diameter of the valve shaft S. Accordingly, as illustrated in FIG. 2, for example, when the valve shaft S of the EGR valve is inserted into the sintered bearing 10 from below, an opening 23 side of the sealing member 12 having the opening 23 of an inner diameter smaller than the diameter of the valve shaft S is curved upward, and an inner peripheral edge of the opening 23 comes into close contact with the valve shaft S. Incidentally, the sealing member 12 may also have a pre-curved shape.

The locking member 13 is a block-shaped member that is formed in an annular shape and is made of, for example, stainless steel, an aluminum alloy, a steel material, or the like. The locking member 13 is in contact with at least the other surface side 12b of the sealing member 12, and interposes the sealing member 12 between the locking member 13 and the bearing main body 11. The locking member 13 is press-fitted against the step portion 22 inside the bearing main body 11. Accordingly, the sealing member 12 is interposed between the locking member 13 and the step portion 22 of the through-hole 21.

With such a configuration, the sintered bearing 10 serves as, for example, a component in which the bearing main body 11 that supports the valve shaft S of the EGR valve and the sealing member 12 that prevents a fluid, for example, gas from moving along the valve shaft S are integrated.

In the present embodiment, the locking member 13 is press-fitted into the bearing main body 11, so that the sealing member 12 made of a flexible material such as resin is interposed and fastened between the bearing main body 11 and the locking member 13. In such a manner, the locking member 13 and the sealing member 12 can be easily integrated by merely fastening by simple processing such as press-fitting the locking member 13 into the bearing main body 11.

Accordingly, as compared to a configuration where the sealing member is directly joined to the bearing main body as in the related art, since the sealing member 12 of the present embodiment is firmly interposed between the bearing main body 11 and the locking member 13 that is press-fitted into the bearing main body 11, there is no risk of occurrence of a defect such as peeling off of the sealing member from the bearing main body, which may occur in direct joining such as bonding, and the sealing member function can be realized with higher reliability and a simpler configuration.

In addition, as compared to a case where the bearing which supports the valve shaft S and the seal which prevents a fluid from moving along the valve shaft are incorporated as separate members, the functions of the bearing and the seal for the fluid can be realized at lower cost and with a simpler configuration.

In addition, since the inner diameter of the opening 23 of the sealing member 12 is smaller than the diameter of the valve shaft S, the opening 23 side of the sealing member 12 is curved upward. Accordingly, gas or the like flow from an upper side toward a lower side of the valve shaft S in FIG. 2 can be more reliably sealed. In addition, since the opening 23 side of the sealing member 12 is curved upward, a contact area between the inner peripheral edge of the opening 23 and the valve shaft S is increased and close contact therebetween becomes more firm, so that a fluid such as gas or the like intending to flow along the valve shaft S can be reliably sealed.

Incidentally, the above-described embodiment provides an example where the bearing member of the invention is applied as a component of the EGR valve provided in the EGR passage of the exhaust gas recirculation device (EGR device); however, the bearing member of the invention can be widely applied to various devices as a bearing member that prevents a fluid from moving around the shaft member and supports the shaft member, and is not limited to a component of the EGR valve.

Second Embodiment

Figure 3:
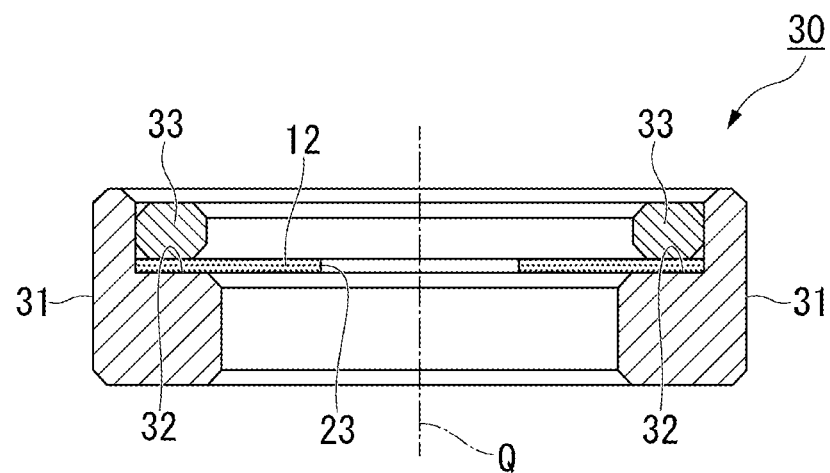
FIG. 3 is a cross-sectional view illustrating a sintered bearing according to a second embodiment of the invention.

FIG. 3 is a cross-sectional view illustrating a sintered bearing according to a second embodiment of the invention. Incidentally, the same members as in the first embodiment illustrated in FIGS. 1 and 2 are denoted by the same reference signs, and descriptions thereof will be omitted.

A sintered bearing 30 of the second embodiment is a modification example of the first embodiment, and includes a bearing main body 31 having a cylindrical shape, a locking member 33 that has a cylindrical shape and is disposed to overlap the bearing main body 31, and the sealing member 12 interposed between the bearing main body 31 and the locking member 33.

A step portion 32 forming a flat surface is formed in the bearing main body 31, and the locking member 33 is press-fitted into the bearing main body 31 such that the sealing member 12 is interposed between the locking member 33 and the step portion 32.

In the present embodiment, the forming position of the step portion 32 of the bearing main body 31 is located in the vicinity of the middle along a height direction of the bearing main body 31 (extending direction of the valve shaft).

According to the sintered bearing 30 of the present embodiment, the sintered bearing 30 in which the bearing main body 31 and the sealing member 12 are integrated can be easily formed by merely disposing the sealing member 12 on the step portion 32 of the bearing main body 31 and press-fitting the locking member 33 into the bearing main body 31. In addition, since the forming position of the step portion 32 of the bearing main body 31 is located in the vicinity of the middle in the height direction of the bearing main body 31, the forming position of the sealing member 12 can be located in the vicinity of the middle in the height direction of the bearing main body 31.

Third Embodiment

Figure 4:
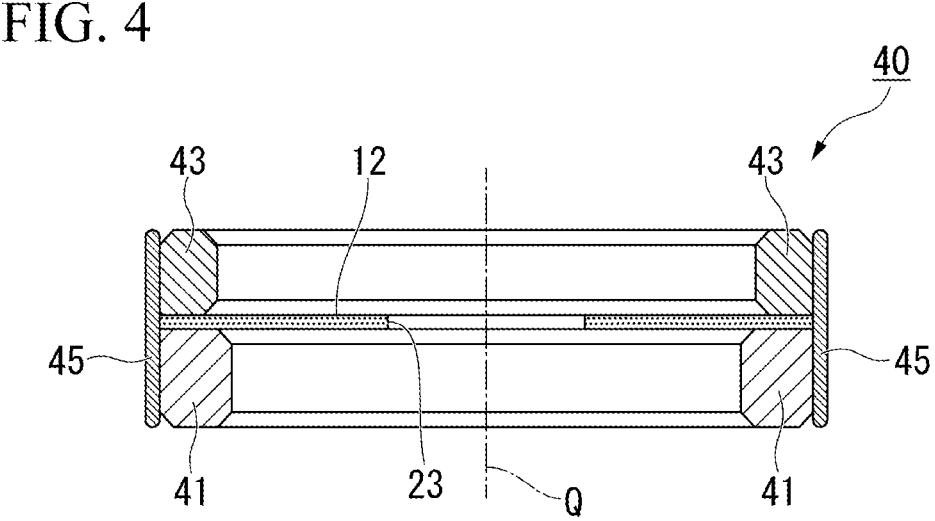
FIG. 4 is a cross-sectional view illustrating a sintered bearing according to a third embodiment of the invention.

FIG. 4 is a cross-sectional view illustrating a sintered bearing according to a third embodiment of the invention. Incidentally, the same members as in the first embodiment illustrated in FIGS. 1 and 2 are denoted by the same reference signs, and descriptions thereof will be omitted.

A sintered bearing 40 of the third embodiment includes a bearing main body 41 having a cylindrical shape, a locking member 43 that has a cylindrical shape and is disposed to overlap the bearing main body 41, the sealing member 12 interposed between the bearing main body 41 and the locking member 43, and a ring member 45 disposed to cover outer peripheral surfaces of the bearing main body 41 and the locking member 43.

The bearing main body 41 and the locking member 43 are press-fitted into the ring member 45.

In addition, in the present embodiment, the cross-sectional width of the locking member 43 is smaller than the cross-sectional width of the bearing main body 41.

According to the sintered bearing 40 of the present embodiment, the sintered bearing 40 in which the bearing main body 41 and the sealing member 12 are integrated can be easily formed by merely interposing the sealing member 12 between the bearing main body 41 and the locking member 43 and press-fitting the bearing main body 41 and the locking member 43 into the ring member 45. In addition, since the cross-sectional width of the locking member 43 is smaller than the cross-sectional width of the bearing main body 41, the weight of the sintered bearing 40 can be reduced.

Fourth Embodiment

Figure 5:
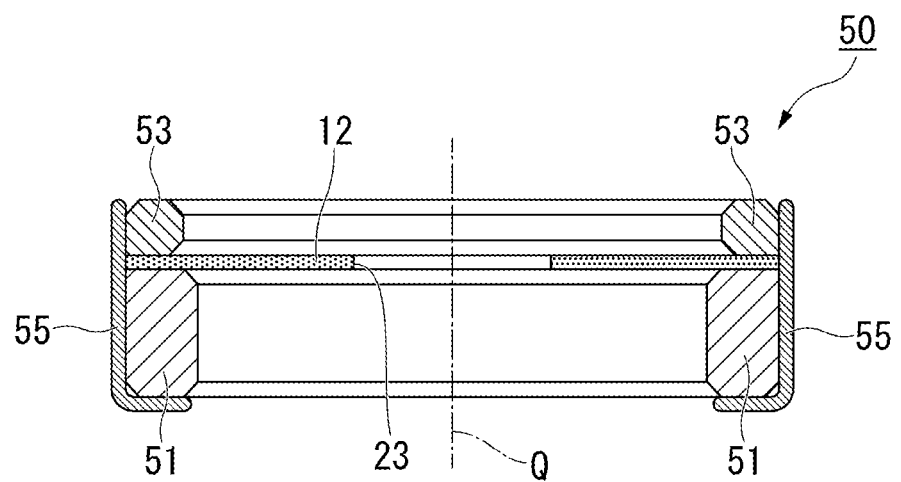
FIG. 5 is a cross-sectional view illustrating a sintered bearing according to a fourth embodiment of the invention.

FIG. 5 is a cross-sectional view illustrating a sintered bearing according to a fourth embodiment of the invention. Incidentally, the same members as in the first embodiment illustrated in FIGS. 1 and 2 are denoted by the same reference signs, and descriptions thereof will be omitted.

A sintered bearing 50 of the fourth embodiment is a modification example of the sintered bearing of the third embodiment, and is a member in which a ring member 55 disposed to cover outer peripheral surfaces of a bearing main body 51 and a locking member 53 is bent on an end portion side of the bearing main body 51 to have a shape with a substantially L-shaped cross-section.

Even with such a configuration, the sintered bearing 50 in which the bearing main body 51 and the sealing member 12 are integrated can be easily formed by merely interposing the sealing member 12 between the bearing main body 51 and the locking member 53 and press-fitting the bearing main body 51 and the locking member 53 into the ring member 55. In addition, since the ring member 55 is bent on the end portion side to have a substantially L shape, when the bearing main body 51 and the locking member 53 interposing the sealing member 12 therebetween are press-fitted into the ring member 55, it is sufficient that the bearing main body 51 is merely pushed into a position to come into contact with a bent portion of the ring member 55. Therefore, a labor-consuming procedure such as adjusting the press-fit position is not required.

Fifth Embodiment

Figure 6:
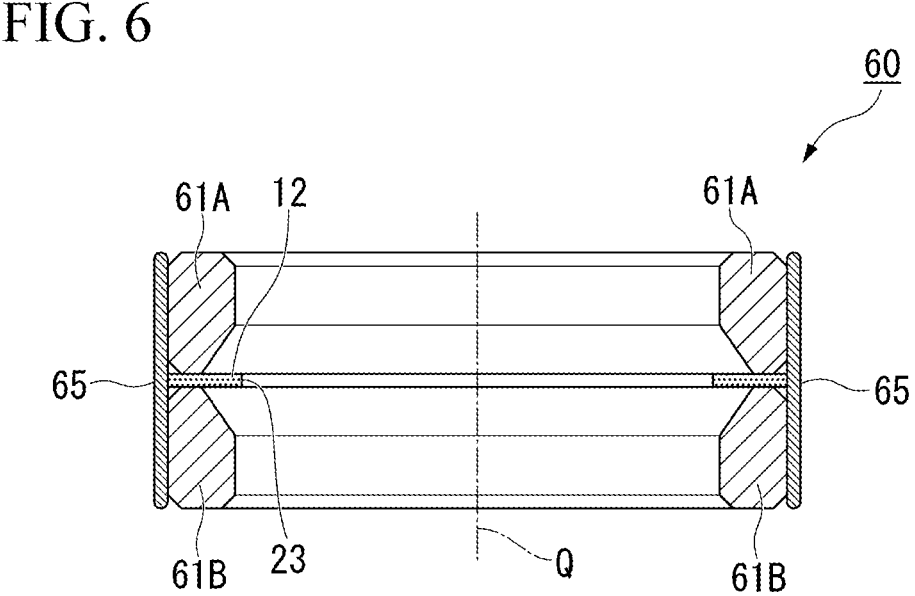
FIG. 6 is a cross-sectional view illustrating a sintered bearing according to a fifth embodiment of the invention.

FIG. 6 is a cross-sectional view illustrating a sintered bearing according to a fifth embodiment of the invention. Incidentally, the same members as in the first embodiment illustrated in FIGS. 1 and 2 are denoted by the same reference signs, and descriptions thereof will be omitted.

A sintered bearing 60 of the fifth embodiment is a modification example of the sintered bearing of the third embodiment, and includes a bearing main body (locking member) 61A and a bearing main body 61B, each of which has a cylindrical shape, the sealing member 12 interposed between the bearing main body (locking member) 61A and the bearing main body 61B, and a ring member 65 disposed to cover outer peripheral surfaces of the bearing main body (locking member) 61A and the bearing main body 61B. The bearing main body (locking member) 61A and the bearing main body 61B are press-fitted into the ring member 65.

In the present embodiment, the bearing main body (locking member) 61A and the bearing main body 61B are formed in the same shape. Then, the bearing main body (locking member) 61A and the bearing main body 61B are press-fitted into the ring member 65 so as to interpose the sealing member 12 therebetween in the vicinity of the middle of a height direction of the ring member 65.

According to the sintered bearing 60 of the present embodiment, a shape in a vertical direction can be symmetrical with respect to the sealing member 12. Accordingly, when the sintered bearing 60 is incorporated as, for example, a component of the EGR valve, the valve shaft is allowed to penetrate therethrough without discriminating the top and bottom of the member, so that the labor required to assemble such a device can be reduced.

Sixth Embodiment

Figure 7:
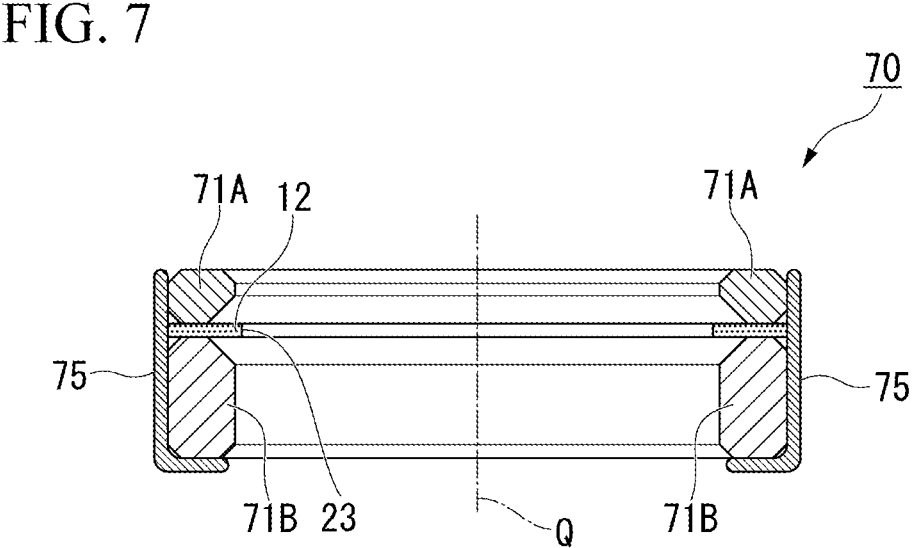
FIG. 7 is a cross-sectional view illustrating a sintered bearing according to a sixth embodiment of the invention.

FIG. 7 is a cross-sectional view illustrating a sintered bearing according to a sixth embodiment of the invention. Incidentally, the same members as in the first embodiment illustrated in FIGS. 1 and 2 are denoted by the same reference signs, and descriptions thereof will be omitted.

A sintered bearing 70 of the sixth embodiment is a modification example of the sintered bearing of the fourth embodiment, and is a member in which a ring member 75 disposed to cover outer peripheral surfaces of a bearing main body (locking member) 71A and a bearing main body 71B is bent on an end portion side of the bearing main body (locking member) 71A and the bearing main body 71B to have a shape with a substantially L-shaped cross-section.

In addition, in the present embodiment, the bearing main body (locking member) 71A and the bearing main body 71B are formed to have the same cross-sectional width.

Even with such a configuration, the sintered bearing 70 in which the bearing main body (locking member) 71A, the bearing main body 71B, and the sealing member 12 are integrated can be easily formed by merely interposing the sealing member 12 between the bearing main body (locking member) 71A and the bearing main body 71B and press-fitting the bearing main body (locking member) 71A and the bearing main body 71B into the ring member 75. In addition, since the ring member 75 is bent on the end portion side to have a substantially L shape, when the bearing main body (locking member) 71A and the bearing main body 71B interposing the sealing member 12 therebetween are press-fitted into the ring member 75, it is sufficient that one bearing main body 71B is merely pushed into a position to come into contact with a bent portion of the ring member 75. Therefore, a labor-consuming procedure such as adjusting the press-fit position is not required. Furthermore, since the bearing main body (locking member) 71A and the bearing main body 71B are formed to have the same cross-sectional width, the sealing member 12 can be interposed with uniform stress without bias.

Seventh Embodiment

Figure 8:
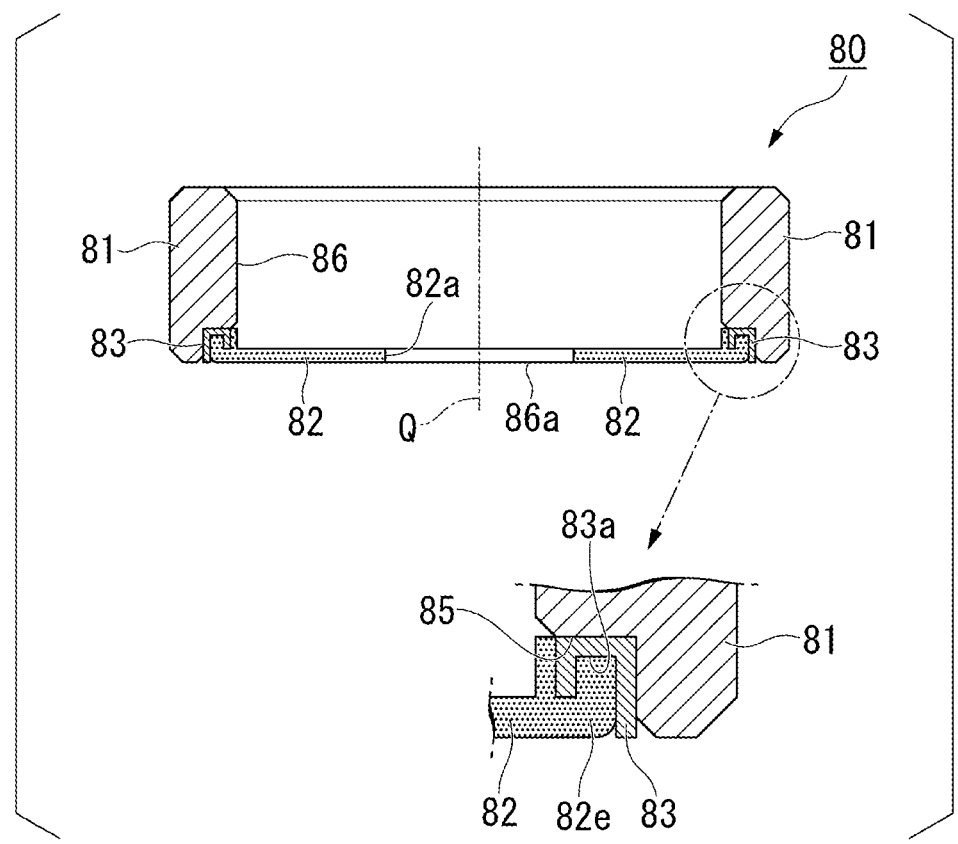
FIG. 8 is a cross-sectional view illustrating a sintered bearing according to a seventh embodiment of the invention.

FIG. 8 is a cross-sectional view illustrating a sintered bearing according to a seventh embodiment of the invention.

A sintered bearing 80 includes a bearing main body 81 having a substantially cylindrical shape, a sealing member 82 in a disk shape and including an opening 82a, and a caulking ring (locking member) 83.

The bearing main body 81 is a substantially cylindrical member, and for example, a through-hole 86 through which the valve shaft of the EGR valve penetrates is formed in a center of the bearing main body 81. A step portion 85 including a flat surface that is widened in a direction perpendicular to the center axis Q is provided at one opening end 86a of the bearing main body 81.

The caulking ring (locking member) 83 is press-fitted into the bearing main body 81 so as to come into contact with the step portion 85. A recessed portion 83a into which a peripheral edge 82e of the sealing member 82 is fitted is formed in the caulking ring 83.

The sealing member 82 is made of, for example, polyurethane rubber, tetrafluoroethylene resin, or the like, and for example, the opening 82a through which the valve shaft of the EGR valve penetrates is formed in a center of the sealing member 82. The peripheral edge 82e is caulked to the recessed portion 83a of the caulking ring 83 so that the sealing member 82 is locked.

According to the sintered bearing 80 of the present embodiment, the sintered bearing 80 in which the bearing main body 81 and the sealing member 82 are integrated can be easily formed by merely locking the peripheral edge 82e of the sealing member 82 into the recessed portion 83a of the caulking ring (locking member) 83 by caulking and then press-fitting the caulking ring 83 against the step portion 85 of the bearing main body 81. Incidentally, after the caulking ring 83 is press-fitted against the step portion 85 of the bearing main body 81, locking can also be performed by caulking such that the peripheral edge 82e of the sealing member 82 is engaged with the recessed portion 83a of the caulking ring 83.

Eighth Embodiment

Figure 9:
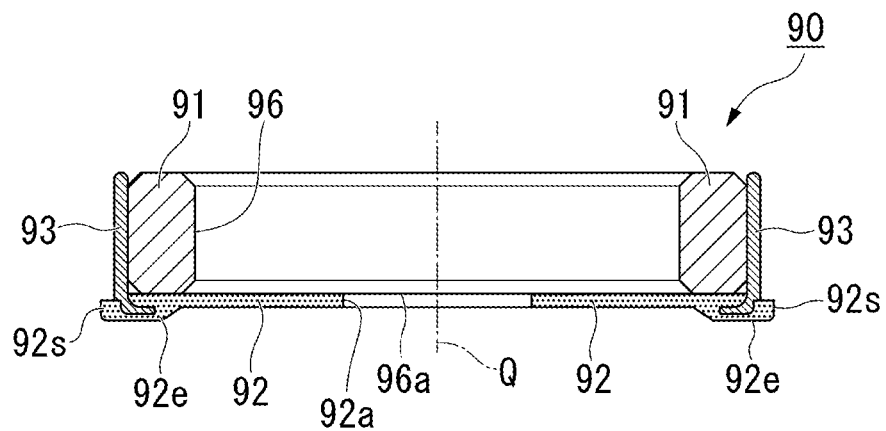
FIG. 9 is a cross-sectional view illustrating a sintered bearing according to an eighth embodiment of the invention.

FIG. 9 is a cross-sectional view illustrating a sintered bearing according to an eighth embodiment of the invention.

A sintered bearing 90 includes a bearing main body 91 having a substantially cylindrical shape, a sealing member 92 in a disk shape and including an opening 92a, and a locking member 93.

The bearing main body 91 is a substantially cylindrical member, and, for example, a through-hole 96 through which the valve shaft of the EGR valve penetrates is formed in a center of the bearing main body 91.

The locking member 93 is a ring-shaped member that covers an outer peripheral surface of the bearing main body 91, and is bent on one opening end 96a side of the bearing main body 91 so as to lock a peripheral edge 92e of the sealing member 92 by caulking.

The sealing member 92 is made of, for example, polyurethane rubber, tetrafluoroethylene resin, or the like, and for example, the opening 92a through which the valve shaft of the EGR valve penetrates is formed in a center of the sealing member 92. An end portion of the locking member 93 is bent, so that the peripheral edge 92e of the sealing member 92 is locked to the locking member 93.

In addition, a protrusion portion 92s protruding further outward than an outer peripheral surface of the locking member 93 is formed at the peripheral edge 92e of the sealing member 92, which is a portion to be locked to the locking member 93.

According to the sintered bearing 90 of the present embodiment, the sintered bearing 90 in which the bearing main body 91 and the sealing member 92 are integrated can be easily formed by merely press-fitting the bearing main body 91 into the locking member 93 having a ring shape and then bending one end side of the locking member 93 to lock the peripheral edge 92e of the sealing member 92 by caulking. In addition, in the sintered bearing 90 of the present embodiment, since the protrusion portion 92s protruding further outward than the outer peripheral surface of the locking member 93 is provided at the peripheral edge 92e of the sealing member 92, the sealing member 92 can also seal gas or the like on an outer peripheral surface side of the locking member 93 in addition to an opening 92a side.

Several embodiments of the invention have been described above, and the embodiments are presented as examples and are not intended to limit the scope of the invention. The embodiments can be implemented in other various forms, and various omissions, replacements, and changes can be made without departing from the concept of the invention. The embodiments and modifications thereof are included in the invention described in the claims and the equivalent scope thereof, similar to being included in the scope and concept of the invention.

INDUSTRIAL APPLICABILITY

According to the sintered bearing of the invention, since the sealing member can be interposed and fastened between the bearing main body and the locking member, the locking member and the sealing member can be easily integrated.

REFERENCE SIGNS LIST

10 Sintered bearing
11 Bearing main body
12 Sealing member
21 Through-hole
22 Step portion (flat surface)

The invention claimed is:

1. A sintered bearing, comprising:
a bearing main body which has a substantially cylindrical shape and is made of a sintered material, a through-hole being formed in a center of the bearing main body;
a locking member configured to be fixed to the bearing main body; and
a sealing member, an opening being formed in a center of the sealing member, and a peripheral edge of the sealing member being configured to be locked by the locking member,
wherein the locking member is a caulking ring that is press-fitted into the bearing main body and is provided with a recessed portion into which the peripheral edge of the sealing member is fitted.

2. A sintered bearing, comprising:
a bearing main body which has a substantially cylindrical shape and is made of a sintered material, a through-hole being formed in a center of the bearing main body;
a locking member configured to be fixed to the bearing main body; and
a sealing member, an opening being formed in a center of the sealing member, and a peripheral edge of the sealing member being configured to be locked by the locking member,
wherein the locking member is configured to cover an outer peripheral surface side of the bearing main body and to lock the sealing member on one end side of the bearing main body by caulking.

3. The sintered bearing according to claim 2,
wherein the sealing member protrudes further outward than an outer peripheral surface of the locking member.

* * * * *